United States Patent [19]
Smith et al.

[11] 3,947,962
[45] Apr. 6, 1976

[54] CHOPPER

[76] Inventors: Robert L. Smith; Gary L. Smith, both of 435 Fair Drive, Apt. No. 103, Costa Mesa, Calif. 92626

[22] Filed: Jan. 31, 1975

[21] Appl. No.: 546,005

[52] U.S. Cl. ..................... 30/128; 83/98; 239/336; 251/215
[51] Int. Cl.² ........................................... B05B 7/14
[58] Field of Search ......... 30/128; 239/336, DIG. 8; 83/98, 347, 348

[56] References Cited
UNITED STATES PATENTS

| | | | |
|---|---|---|---|
| 3,011,257 | 12/1961 | Bamberger | 30/128 |
| 3,034,213 | 5/1962 | Milligan | 30/128 |
| 3,130,912 | 4/1964 | Shelton | 239/336 |
| 3,155,320 | 11/1964 | Jones | 239/336 X |
| 3,491,443 | 1/1970 | Fram | 30/128 |

Primary Examiner—Al Lawrence Smith
Assistant Examiner—J. C. Peters
Attorney, Agent, or Firm—Lindenberg, Freilich, Wasserman, Rosen & Fernandez

[57] ABSTRACT

A chopper assembly of the type normally mounted on a spray gun to chop and spray fiberglass or the like, and which includes a backup roll driven by an air motor and a cutter roll. The exhaust of the air motor is expelled through air jets in the cutter roll to help drive the cutter roll while also muffling the sound of the exhausting air. The chopper frame is mounted on the gun by a hollow universal joint of the ball and socket type, which carries air to the chopper at any chopper orientation without the need for external flexible hoses or the like.

5 Claims, 6 Drawing Figures

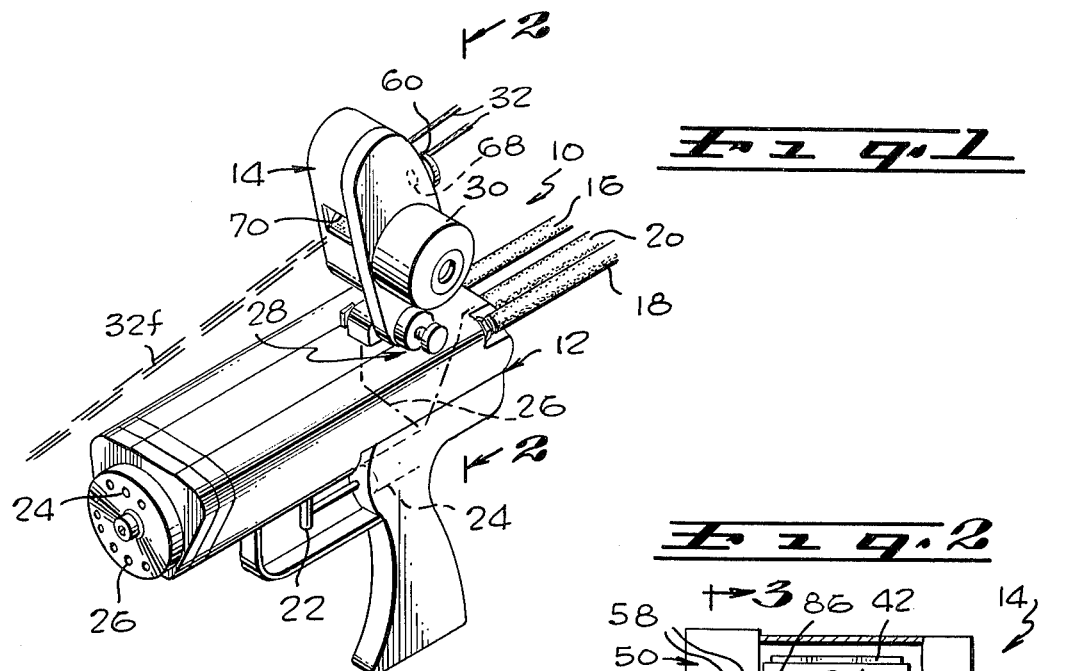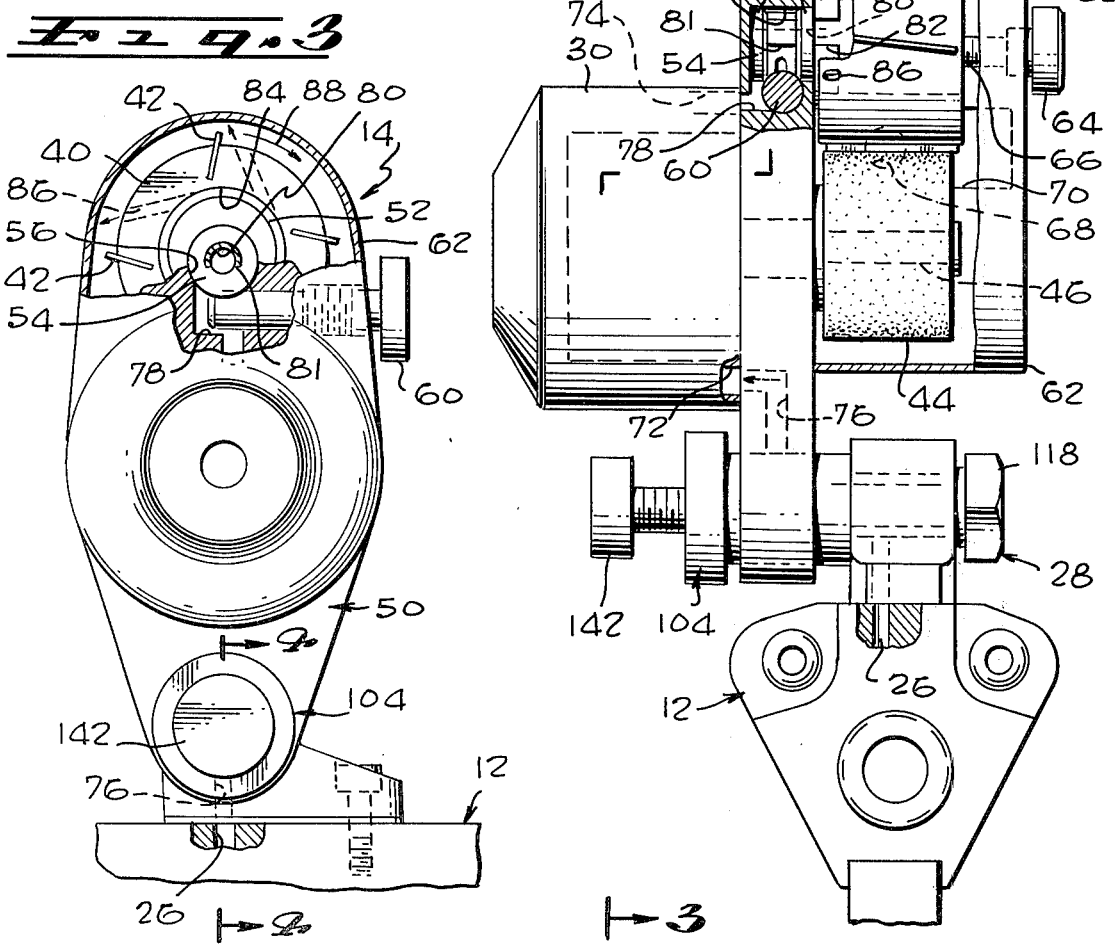

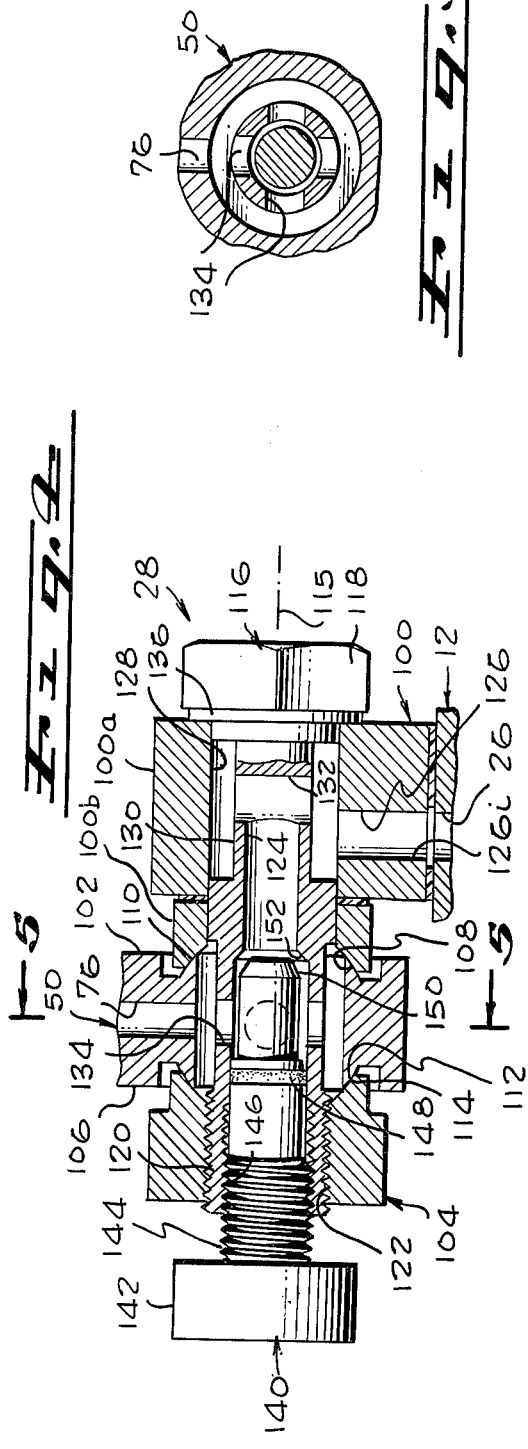
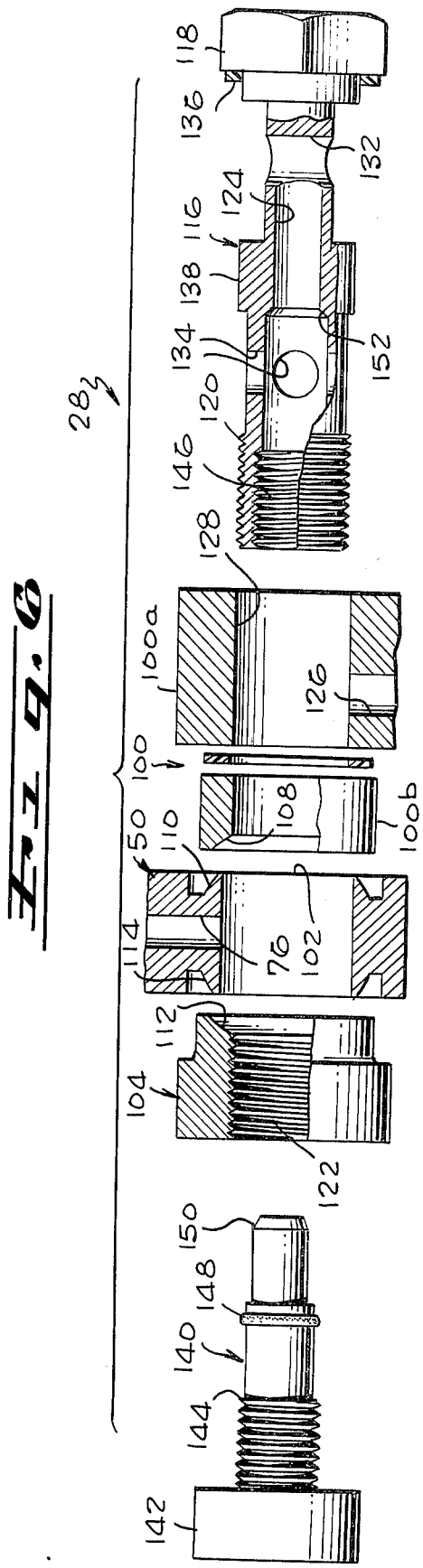

CHOPPER

BACKGROUND OF THE INVENTION

This invention relates to chopper apparatus and to universal joint apparatus.

One type of spray gun system employs a gun that sprays resin and catalyst and a chopper mounted on the gun for chopping fiberglass and spraying it onto the area that receives the resin and catalyst. The chopper commonly employs an air motor which drives a rubber backup roll. A cutter roll with blades at its periphery, is positioned to roll against the backup roll to cut fiberglass fed between the rolls, but there is often slippage of the cutter roll which prevents the uniform cutting and projecting of fibers. Cost and weight can be saved by eliminating any gear or other connection between the rolls, but there is often slippage of the cutter roll which prevents the uniform cutting and projecting of fibers. Cost and weight also can be minimized by eliminating any muffling device at the exhaust of the air motor, but the air motor often tends to produce a loud and annoying whine sound. A construction which resulted in more reliable rotation of the cutter roll, and also resulted in muffling of the air motor sound, at low cost and without substantial weight increase, would be of substantial benefit to industry.

Where a chopper assembly is fastened to a spray gun, it is generally desirable to provide for limited pivotal adjustment of the chopper both up and down and from side to side. This permits the worker to adjust the chopper to spray fibers at any location with respect to the resin and catalyst spray. Pressured air for the air motor of the chopper is typically supplied through a flexible air hose, with a valve therealong. While flexible hoses are adequate, they tend to clutter the apparatus, and any elimination of flexible hoses or the like is desirable in streamlining the apparatus.

SUMMARY OF THE INVENTION

In accordance with one embodiment of the present invention, a chopper apparatus is provided which is relatively simple and efficient. The chopper includes backup and cutter rolls that roll on one another, and an air motor directly connected to the backup roll. The air motor is coupled to the cutter roll, and the cutter roll has air jets through which the air is expelled, the air jets directed opposite to the rotational direction of the cutter roll. The air jets provide torque helping to turn the cutter roll to prevent slippage between it and the backup roll, this turning of the cutter roll being accomplished without gears or other solid mechanical coupling between the air motor and cutter roll. The exhausting of air from the air motor through the air jets also results in a substantial reduction in noise from the air motor, particularly the high pitched whine, without the need for an auxiliary exhaust muffler.

The present invention also provides a universal mechanical and fluid coupling which can be used to connect the chopper to a spray gun. The coupling includes a chopper frame with ball surfaces on opposite sides thereof, a gun mount fixed to the spray gun and having a socket surface disposed against one of the ball surfaces, and a backup member disposed against the other ball surface. A bolt-like fastener extends through a hole located in the chopper frame within the ball surfaces thereof, and connects the backup member to the gun mount. The gun mount has an air passage leading to the center of its socket surface, while the chopper frame has another passage extending from a location between the ball surfaces to the air motor. The bolt-like fastener is hollow to carry air from the gun mount to the chopper motor and thence to the air motor, at all orientations of the chopper with respect to the spray gun.

The novel features that are considered characteristic of this invention are set forth with particularity in the appended claims. The invention will be best understood from the following description when read in connection with the accompanying drawings.

BRIEF DESCRIPTION OF THE DRAWINGS

FIG. 1 is a perspective view showing the chopper and coupling apparatus of the invention mounted on a spray gun;

FIG. 2 is a view taken on the line 2—2 of FIG. 1;

FIG. 3 is a view taken on the line 3—3 of FIG. 2;

FIG. 4 is a view taken on the line 4—4 of FIG. 3;

FIG. 5 is a view taken on the line 5—5 of FIG. 4; and

FIG. 6 is an exploded sectional side view of the universal coupling shown in FIG. 4.

DESCRIPTION OF THE PREFERRED EMBODIMENTS

FIG. 1 illustrates a spraying assembly 10 which includes a spray gun 12 and a chopper apparatus 14 mounted on top of the spray gun. The gun 12 receives resin and catalyst from two material hoses 16, 18, and receives air from an air hose 20. When a workman pulls on a trigger 22 he opens material valves (not shown) in the gun so that resin and catalyst are sprayed out of two nozzles 24, 26 at a workpiece (not shown). The trigger 22 operates an air valve 24 which connects air from the air hose 20 to a chopper air passage 26 that leads to the chopper apparatus 14. The air passes through a universal coupling 28 that leads to an air motor 30 of the chopper apparatus to energize it. The chopper apparatus then draws in ropes or wires 32 of fiberglass or other choppable material, chops the wire to form fibers, and hurdles or sprays the fibers 32f onto the resin and catalyst spray so the fibers move to the workpiece.

FIGS. 2 and 3 show that the chopper apparatus includes a cutter roll 40 with four blades 42, for cutting the fiberglass wire, and a rubber backup roll 44 positioned to roll against the cutter roll. The backup roll 44 is mounted on the shaft 46 of the air motor 30, the motor being mounted on the chopper frame 50 with its shaft passing through a hole in the frame. The cutter roll 40 is rotatably mounted on a stationary cutter roll shaft 52 which has an inner end 54 held in a bearing hole 56 formed in the cutter frame. The inner end 54 of the shaft has a pair of axially spaced flanges 58 which are closely received in the bearing hole 56. A retainer pin 60 which is pivotally mounted on the cutter frame 50, lies between the flanges to hold the shaft in place. The axis of the flanges 58 is off-center, or spaced, from the axis of rotation of the cutter roll, to permit adjustment of pressure of the rolls on one another, although the offcenter distance is small enough that the flanges and bearing hole 56 are substantially coaxial with the cutter roll. A cover 62 which surrounds the rolls is held by a knob 64 that screws onto a threaded outer end 66 of the cutter roll shaft. The cover 62 has a wire input hole 68 for receiving wires to be chopped, and an outlet hole 70 through which chopped fibers are hurdled.

The air motor 30 has an air inlet 72 which receives compressed air, and an outlet 74 for discharging air.

The cutter frame 50 is formed with an inlet passageway 76 which carries air to the air motor, and an outlet passageway 78 which carries away air from the outlet of the motor. In accordance with the present invention, air from the motor outlet 74 is directed through the cutter roll 40 to help turn the cutter roll and muffle the sound normally emitted from the air motor along with the air discharging therefrom. The outlet passageway 78 in the cutter frame connects with the bearing hole 56 at a location between the flanges 58 of the shaft. The inner end of the shaft 52 has a hollow axial passage 80 which receives air through one radial hole 81 and which discharges air through another radial hole 82 into a hollow inner end 84 formed in the cutter roll. The air in the hollow portion 84 of the roll exits through four jet passages 86 formed in the roll. The jet passages 86 are angled to discharge air with a directional component opposite to the direction of rotation of the cutter roll, as indicated by arrow 88, so that the exiting air tends to turn the cutter roll in its direction of rotation.

The torque produced by air exiting from the jet passages 86 helps to turn the cutter roll 40 so as to minimize slippage with respect to the backup roll 44. Thus, the cutter roll 42 is driven without requiring gears or other solid mechanical connections to the air motor, so that the cost and complexity of the cutter is minimized while also providing substantial torque to the cutter roll to minimize slippage.

The coupling of the air motor outlet to the cutter roll and the discharge of the air through the jet passages, has also been found to substantially reduce noise from the air motor, and particularly the high pitched whine. It is believed that the discharge of air in a direction opposite to rotation of the cutter roll helps to slow the velocity of the discharging air and that this combined with the convoluted passageway through which the air must pass helps to reduce the noise. In any case, the reduction of noise is accomplished without the need for a separate air muffling device which would add to the cost and complexity of the chopper. The air control arrangement therefore provides the advantages of applying torque to the cutter roll and reducing noise from the air motor, all in a relatively simple and inexpensive arrangement.

FIGS. 4–6 illustrate details of the universal coupling 28 which couples the chopper to the spray gun. The universal coupling includes a mount 100 which is rigidly fixed to the top of the spray gun 12 and which lies on one side 102 of the chopper frame 50, and a backup member 104 which lies at the opposite side 106 of the chopper frame. The mount 100, which includes a pair of members 100a, 100b for convenience in manufacture, has a concave spherical surface 108 disposed against one side 102 of the chopper frame. The chopper frame forms a convex spherical surface 110 which engages the mount surface 108. In a similar manner, the backup member 104 forms a concave spherical surface 112 which engages a convex spherical surface 114 formed at the opposite side 106 of the chopper frame and concentric with the other convex surface 110. The mount 100 and backup member 104 therefore form a partial socket while the frame forms a partial ball resting in the socket, to permit the chopper frame to pivot in any direction within a limited angle. The chopper can pivot over a wide angle about the axis 115 of the coupling but only on the order of 15° about perpendicular axes. However, the limited angle of pivoting from side to side is normally sufficient for proper setup of the chopper.

A bolt-like fastener 116 serves to hold the mount 100 to the backup member 104 so that they can closely engage the chopper frame. The amount 100, chopper frame 50, and backup member 104 all have holes within their corresponding spherical surfaces to permit reception of the fastener 116, the spherical surfaces therefore being annular or ring-shaped. The fastener has a head 118 that bears against the mount 100 and has a threaded end 120 that is threadably received in a corresponding threaded hole 122 of the backup member. When the fastener 116 is loosened slightly, the chopper frame 50 can be pivoted in any direction. When the fastener 116 is tightened by screwing it fully into the backup member 104, the chopper frame 50 is firmly squeezed between the mount 100 and backup member 104, and the chopper thereafter cannot pivot, so that it is held in the chosen orientation. It may be noted that if the backup member 104 is prevented from rotating while the fastener 116 is turned, tightening will occur without any tendency to pivot the chopper frame.

The universal coupling 28 is constructed not only to provide mechanical holding of the chopper frame to the spray gun, but also to permit the flow of air from the spray gun to the air motor of the chopper without requiring a flexible hose or the like. To this purpose, the fastener 116 is constructed with a shaft having an axial passage 124 for carrying air. The mount 100 includes a hole or passage 126 whose lower end 126i forms an air input port that lies directly over the chopper air passageway 26 which is formed in the spray gun, the upper end of the passage 126 forming a fastener-receiving hole 128 in the mount. The fastener 116 has a reduced-diameter portion 130 lying within the fastener-receiving hole 128, so that air can flow thereabout and through a radial hole 32 into the fastener passageway 124. The fastener has another set of radial holes 134 lying within the chopper frame 50 where air is discharged to enter the inlet passage 76 of the chopper frame that leads to the inlet of the air motor. Thus, air can pass through the fastener 116 from the spray gun and mount 100 to the chopper frame 50. The fastener 116 is constructed to minimize leakage of air from the universal coupling. A rubber washer 136 seals the head end of the fastener to the mount 100. A flange 138 formed on the fastener lies in the fastener-receiving passage 128 of the mount to tend to block the escape of air except through the inner passageway 124 of the fastener.

The universal coupling includes a flow control member 140 which can control the amount of air flowing to the air motor. The flow control member 140 has a manually turnable knob 142, a threaded portion 144 which is received in a threaded hole 146 formed at the end of the fastener 116 opposite the head thereof, an O-ring 148 sealed to the inside or passage 124 of the fastener at a location past the radial holes 134, and a tapered blocking end portion 150. As the flow control member 140 is turned to advance into the fastener 116, the tapered blocking end portion of the flow control member moves towards a step 152 formed on the inside of the fastener to block the passage of air through the fastener. Thus, a workman can adjust the flow of air or even block it completely by adjustment of the flow control member 140.

The universal coupling 28 therefore provides multiple functions in a relatively simple and compact arrangement. That is, the coupling provides a ball and socket type joint for holding the chopper on a spray gun with the chopper being fixable at any desired orientation within a certain range, as well as providing a passageway and valve arrangement lying within the spherical surfaces of the ball and joint arrangement to carry air between the universally-coupled members at any orientation of the chopper and without the need for an external flexible hose or the like. This is accomplished by utilizing the chopper frame 50 as one mount which is located between two other mounts formed by the gun mount 100 and backup member 104, all with mating spherical surface and with passages in two of the mounts extending to locations within the spherical surfaces.

Thus, the invention provides a spray gun assembly with a chopper apparatus which is compact and economical. Only one of the two chopper rolls is mechanically connected to the air motor, the other one obtaining some rotational driving through the discharge of air through jet passages directed opposite to the rotation of the roll. By utilizing the exhaust of the air motor as the air supply for driving the roll, muffling of the air motor exhaust is achieved without further complication of the machine. A universal coupling for connecting the chopper frame to the spray gun, utilizes mating spherical surfaces on opposite sides of the chopper frame and on a mount and backup member, the chopper frame and mount having holes within the spherical surfaces to also transmit air through the joint. A hollow fastener within the holes transmits the air and receives a flow control member to regulate the air flow.

Although particular embodiments of the invention have been described and illustrated herein, it is recognized that modifications and equivalents may readily occur to those skilled in the art and consequently, it is intended that the claims be interpreted to cover such modifications and equivalents.

The embodiments of the invention in which an exclusive property or privilege is claimed are defined as follows:

1. Chopper apparatus designed to be used with a spray gun to chop and deploy wires of fiberglass or other material, comprising:
    a frame;
    a cutter roll rotatably mounted on said frame;
    a backup roll rotatably mounted on said frame; and having a periphery which substantially rolls on said cutter roll;
    an air motor mounted on said frame and having an air motor shaft connected to a first of said rolls to rotate it in a predetermined direction, said motor having an inlet for receiving compressed air and an outlet for discharging air;
    a second of said rolls having at least one jet passage with an outlet oriented with a directional component opposite to the direction of rotation of the roll; and
    air coupling means for coupling air to said jet passage.

2. The apparatus described in claim 1 wherein:
    said air coupling means couples the outlet of said air motor to said jet passage.

3. The apparatus described in claim 2 wherein:
    said air motor shaft is connected to said backup roll to rotate it, and said jet passage is formed in said cutter roll.

4. The apparatus described in claim 1 wherein:
    said frame has a bearing hole substantially coaxial with said second roll, an air passage forming said air coupling means and extending from said air motor outlet and intersecting said bearing hole, and a retainer hole extending perpendicular to said bearing hole and intersecting it, and including
    a shaft mounted on said frame and rotatably supporting said second roll, said shaft having an inner end forming a pair of axially spaced flanges disposed in said bearing hole, said inner end of said shaft having an axially-extending passageway, a radial hole lying between said flanges for receiving air, and another radial hole on the outer side of said flanges and within said second roll for discharging air to flow through said jet passage; and
    a retainer pin mounted in said retainer hole and extending between said flanges to hold said inner end of said shaft in said frame.

5. Application apparatus comprising:
    a spray gun; and
    a chopper mounted on said spray gun, said chopper having a cutter roll, a backup roll, and an air motor with an output shaft coupled to a first of said rolls and an air outlet coupled to a second of said rolls;
    said second roll having a jet outlet coupled to said motor air outlet and oriented to urge rotation of said second roll.

* * * * *